(Model.)

A. CULLON.
PARTURITION SHEARS.

No. 335,796. Patented Feb. 9, 1886.

WITNESSES:
F. McArdle
C. Sedgwick

INVENTOR:
A. Cullon
BY Munn & Co
ATTORNEYS.

UNITED STATES PATENT OFFICE.

ALEXANDER CULLON, OF LINDSAY, ONTARIO, CANADA.

PARTURITION-SHEARS.

SPECIFICATION forming part of Letters Patent No 335,796, dated February 9, 1886.

Application filed June 30, 1885. Serial No. 170,261. (Model.)

*To all whom it may concern:*

Be it known that I, ALEXANDER CULLON, of Lindsay, in the county of Victoria, Province of Ontario, and Dominion of Canada, have invented a new and useful Improvement in Parturition-Shears, of which the following is a full, clear, and exact description.

My invention relates to that class of shears used by veterinary surgeons in surgical operations incident to cases of parturition, the object of my invention being to construct an instrument that will be effective in its operation, and by which the animal operated upon will not be liable to accidental injury.

Reference is to be had to the accompanying drawings, forming part of this specification, in which similar letters of reference indicate corresponding parts in both the figures.

Figure 1:
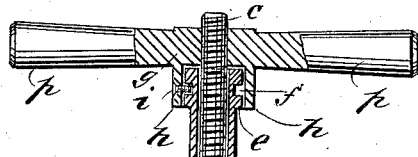
Figure 1:
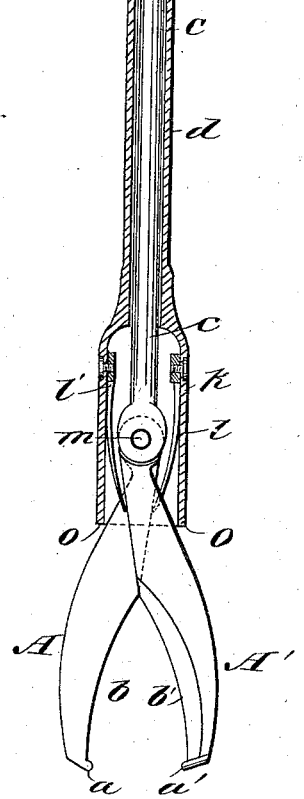
Figure 2:
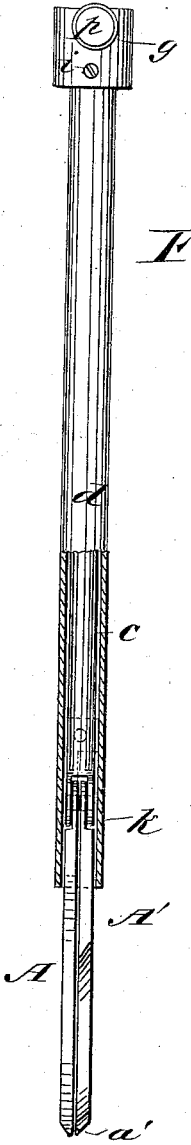

Figure 1 is a face view of my improved form of shears, shown partly in section, to disclose the interior arrangement; and Fig. 2 is a side view of the shears, also shown partly in section.

A A' represent the blades of my shears, which are preferably formed with curved cutting-edges $b$ $b'$, terminating in rounded knobs $a$ $a'$. These blades A A' are pivotally connected to a rod, as $c$, by means of a pivot, as $m$. The rod $c$ projects through a tube, $d$, upon the upper end of which there is a collar, $e$, formed with an annular groove, $f$. A handled nut, $g$, provided with a downwardly-projecting annular flange, $h$, that encircles the collar $e$, engages with the protruding threaded end of the rod $c$, said nut $g$ being retained in position by means of a short pin, $i$, that passes through and is held by the flange $h$, and rides in the groove $f$, formed in the collar $e$. To the lower end of the tube $d$ there is attached a retaining-box, $k$, from which the blades A A' project. Within this box $k$ there are arranged two springs, $l$ $l'$, which bear, respectively, upon the inner edges of the blades A and A', and constantly act to force the blades open or apart.

To operate the shears, the nut $g$ is turned by means of its handles $p$ $p$, so as to retract the rod $c$, and thereby draw the blades A A' within the box $k$. Now, as the blades are drawn into the box $k$, the pressure exerted upon them by the edges $o$ $o$ of said box closes them, thus cutting whatever may be between their edges. On reversing the motion of the nut $g$ the rod $c$ will be forced in an opposite direction and push the blades out of the box $k$, thus gradually removing the pressure of the edges $o$ $o$ upon the backs of the blades A A', so that the action of the springs $l$ $l'$ upon their inner edges will cause them to separate.

Such an instrument as I have described is simple in construction and effective in operation, and the blades being arranged to fold within the box $k$, and being formed with rounded knobs, as $a$ $a'$, are not liable to injure the animal that is operated upon.

Having thus described my invention, I claim as new and desire to secure by Letters Patent—

1. The combination, with retractible blades A A', of a rod, $c$, a tube, $d$, provided with a box, $k$, and a manipulating device, consisting of a nut, $g$, formed with a flange, $h$, carrying a pin, $i$, arranged to ride in a groove, $f$, substantially as described.

2. The combination, with retractible blades A A', a rod, $c$, a tube, $d$, provided with a box, $k$, and a manipulating device, of a pair of springs, $l$ $l'$, substantially as described.

3. The combination, with the retractible blades A A', formed with the knobs $a$ $a'$, of a tube, $d$, formed with a box, $k$, a manipulating device, and a pair of springs, $l$ $l'$, substantially as described.

ALEXANDER CULLON.

Witnesses:
ALEXANDER SKINNER,
MINNIE BURTON.